(12) United States Patent  
Burri et al.

(10) Patent No.: US 10,777,780 B2  
(45) Date of Patent: Sep. 15, 2020

(54) BATTERY WITH A NON-CONDUCTIVE STRUCTURED SURFACE

(71) Applicant: THE SWATCH GROUP RESEARCH AND DEVELOPMENT LTD, Marin (CH)

(72) Inventors: Yves Burri, Epalinges (CH); Michael Stalder, Bienne (CH); Jean-Claude Martin, Montmollin (CH)

(73) Assignee: THE SWATCH GROUP RESEARCH AND DEVELOPMENT LTD, Marin (CH)

( * ) Notice: Subject to any disclaimer, the term of this patent is extended or adjusted under 35 U.S.C. 154(b) by 144 days.

(21) Appl. No.: 15/102,457

(22) PCT Filed: Dec. 16, 2014

(86) PCT No.: PCT/EP2014/077989  
§ 371 (c)(1),  
(2) Date: Jun. 7, 2016

(87) PCT Pub. No.: WO2015/091503  
PCT Pub. Date: Jun. 25, 2015

(65) Prior Publication Data  
US 2016/0315295 A1    Oct. 27, 2016

(30) Foreign Application Priority Data  
Dec. 19, 2013   (EP) ..................... 13198585

(51) Int. Cl.  
*H01M 2/00*   (2006.01)  
*H01M 6/12*   (2006.01)  
(Continued)

(52) U.S. Cl.  
CPC ......... *H01M 2/0222* (2013.01); *H01M 2/026* (2013.01); *H01M 2/0277* (2013.01);  
(Continued)

(58) Field of Classification Search  
None  
See application file for complete search history.

(56) References Cited

U.S. PATENT DOCUMENTS 5,058,992 A * 10/1991 Takahashi ............ G02B 5/1842  
                                                            359/558  
5,104,480 A *  4/1992 Wojnarowski ....... H01C 17/242  
                                                            216/65  
(Continued)

FOREIGN PATENT DOCUMENTS

JP     04-269446 A    9/1992  
JP    2003-217533 A    7/2003  
(Continued)

OTHER PUBLICATIONS

International Preliminary Report on Patentability dated Dec. 16, 2014 in International Application No. PCT/EP2014/077989.  
(Continued)

*Primary Examiner* — Cynthia H Kelly  
*Assistant Examiner* — Julian Anthony  
(74) *Attorney, Agent, or Firm* — Oblon, McClelland, Maier & Neustadt, L.L.P.

(57) ABSTRACT

A battery or an accumulator including an anode case, an anode situated inside the anode case, a cathode case joined to the anode case, a seal sealing the cathode case to the anode case, a cathode situated inside the cathode case between the anode and the cathode case, and a membrane between the anode and the cathode. An outer surface of the battery includes at least one marking.

19 Claims, 2 Drawing Sheets

(51) Int. Cl.
*H01M 6/46* (2006.01)
*H01M 2/02* (2006.01)
*H01M 2/34* (2006.01)
*H01M 2/04* (2006.01)

(52) U.S. Cl.
CPC ....... *H01M 2/0285* (2013.01); *H01M 2/0404* (2013.01); *H01M 2/0465* (2013.01); *H01M 2/0482* (2013.01); *H01M 2/342* (2013.01); *H01M 2/344* (2013.01); *H01M 2200/30* (2013.01); *H01M 2220/30* (2013.01)

(56) References Cited

U.S. PATENT DOCUMENTS

| | | | |
|---|---|---|---|
| 5,202,199 A | * | 4/1993 | Mitzutani ............... H01M 2/02 429/1 |
| 5,418,088 A | * | 5/1995 | Alexandres ........ B23K 26/0838 372/10 |
| 2001/0030002 A1 | * | 10/2001 | Zheng ....................... C23C 8/10 148/241 |
| 2006/0282307 A1 | * | 12/2006 | Cheng ................ G06Q 20/3433 705/14.64 |
| 2011/0091753 A1 | | 4/2011 | Wang et al. |

FOREIGN PATENT DOCUMENTS

JP    2008-021566 A    1/2008
JP    2013-033937 A    2/2013

OTHER PUBLICATIONS

International Search Report dated Mar. 19, 2015, in PCT/EP2014/077989 filed Dec. 16, 2014.

* cited by examiner

BATTERY WITH A NON-CONDUCTIVE STRUCTURED SURFACE

CROSS-REFERENCE TO RELATED APPLICATIONS

This is a National phase application in the United States of International patent application PCT/EP2014/077989 filed Dec. 16, 2014 which claims priority on European patent application 13198585.5 filed Dec. 19, 2013. The entire disclosures of the above patent applications are hereby incorporated herein by reference.

The present invention concerns a battery or an accumulator including an anode case, an anode situated inside the anode case, a cathode case joined to the anode case, a seal sealing the cathode case to the anode case, a cathode situated inside the cathode case between the anode and the cathode case, and a membrane between the anode and the cathode.

PRIOR ART

There are known electrical energy accumulators such as button cell batteries for powering electrical devices such as watches or calculators shown in FIG. 1. These batteries 1 include an anode case 2, an anode 4 situated inside the anode case, a cathode case 3 joined to the anode case 2, a seal 6 sealing the cathode case to the anode case, a cathode 5 situated inside the cathode case between the anode and the cathode case, and a membrane 7 between the anode and the cathode.

To distinguish between the various types of button cell batteries, markings 8 are made on one of the external surfaces of the battery, namely on the cathode case surface or on that of the anode case.

These markings may be made in various different ways. A first method consists in using an ink or a paint which is deposited on one of the surfaces of the battery. This method has the advantage of being simple and easy to adapt. Indeed, it is easy to change from a marking for a first type of battery to a marking for a second type of battery.

However, a first drawback of this solution is ensuring good adhesion of the layer to the battery case. Another drawback is that the paint or ink on the battery can easily be erased or scratched. Indeed, these batteries are handled without care, and may be dropped or be subject mechanical wear causing the appearance of scratches or deformations which deteriorate the ink or paint. If the deposited layer deteriorates, the ink or paint residue may come away from the battery surface and pollute the electrical contact or disrupt normal operation of the device.

Another solution consists in forming a marking 8b, 8c by stamping. This method consists in plastically deforming the anode case, or more conventionally the cathode case, with the aid of a punch press. Stamping can produce a marking 8b which will be visible from the other side of the case or simply a marking 8c made by crushing material. However, this method has the drawback of involving more complex management. Indeed, a different punch is required for each marking.

Consequently, this involves a complex battery manufacturing process wherein the punch must be changed on each change of marking or wherein series of batteries with one or more specific markings are made in succession.

SUMMARY OF THE INVENTION

The invention concerns an electrical energy accumulator such as an electric cell battery which overcomes the aforementioned drawbacks of the prior art by proposing a battery able to accommodate a simple and durable marking.

To this end, the invention concerns a battery or accumulator including an anode case, an anode situated inside the anode case, a cathode case fixed to the anode case, a seal sealing the cathode case to the anode case, a cathode situated inside the cathode case between the anode and the cathode case, and a membrane between the anode and the cathode, the anode case and the cathode case that are fixed to each other respectively having a first outer surface and a second outer surface, a third outer surface being secant with said first and second surfaces and serving as an edge of the accumulator, the accumulator being characterized in that one outer surface of said accumulator includes at least one marking created by local heating of the material, said marking being electrically insulating.

In a first advantageous embodiment, said local heating of the material forming the marking removes material.

In a second advantageous embodiment, said local heating of the material forming the marking is performed by laser.

In a third advantageous embodiment, said marking extends over at least any one of the outer surfaces of the accumulator.

In a fourth advantageous embodiment of the invention, said local heating of material by laser is performed such that the marking has a colour that contrasts with the material of the surface to which said marking is applied.

In another advantageous embodiment of the invention, the marking is a decorative image.

In another advantageous embodiment of the invention, the marking is an anti-counterfeiting device.

In another advantageous embodiment of the invention, the anti-counterfeiting device includes a combination of several recesses of different surface dimensions forming a unique arrangement.

In another embodiment of the invention, the anti-counterfeiting device includes a combination of several recesses arranged parallel to each other, the space between two recesses and the width of said recesses being heterogeneous to form a unique arrangement.

In another advantageous embodiment of the invention, the battery further includes at least one electrically conductive marking.

The invention also concerns an electronic apparatus including a closed case which contains an electronic module, said case including a hatch closed by a hatch cover in which an accumulator for electrically powering the electronic module may be arranged, characterized in that the accumulator is an accumulator according to any of the preceding claims.

In an advantageous embodiment of the invention, the hatch cover is made of transparent material to allow the marking of said accumulator to be seen.

In an advantageous embodiment of the invention, the accumulator case includes a decoration and the marking of the accumulator is achieved such that said decoration and said marking combine to form an attractive assembly.

In another advantageous embodiment of the invention, the case includes connectors for obtaining an electrical connection between said accumulator and said electronic module and said marking of said accumulator is achieved such that said electrical connection is not disrupted.

BRIEF DESCRIPTION OF THE DRAWINGS

Other advantages and features of the battery according to the present invention will appear more clearly upon reading the following detailed description of embodiments of the invention, given solely by way of non-limiting examples and illustrated by the annexed drawings, in which.

DETAILED DESCRIPTION OF THE INVENTION

Figure 1:
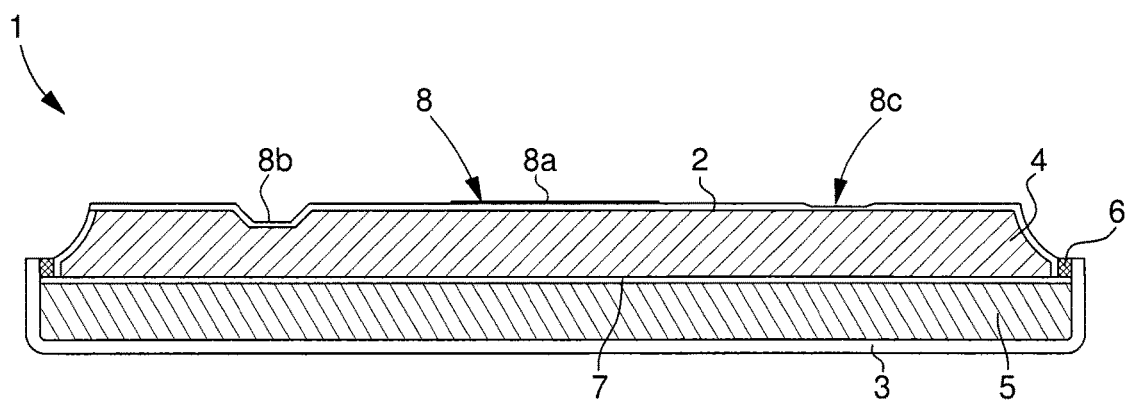
FIG. 1 is a schematic cross-sectional view of a battery according to the prior art.
Figure 2:
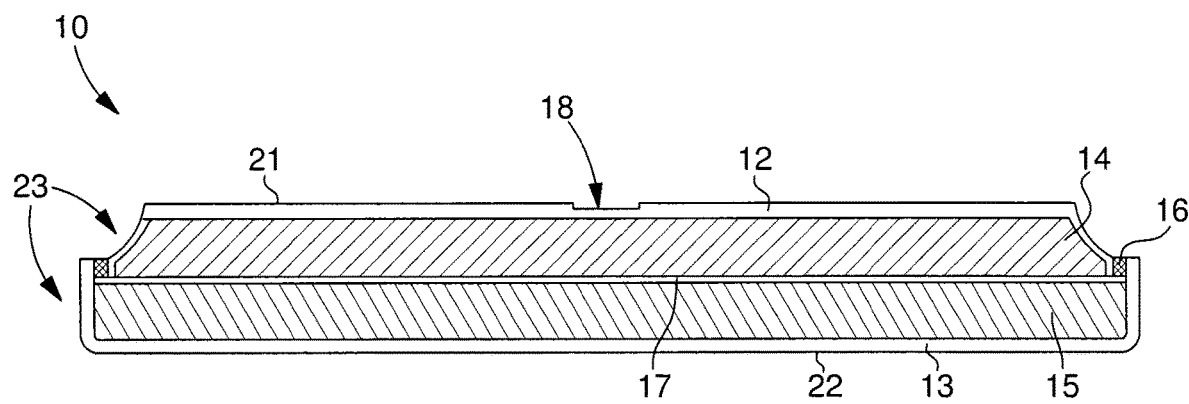
FIG. 2 is a schematic cross-sectional view of a battery according to the invention.

FIG. 2 shows an electrical energy accumulator 10 as a battery according to the invention; said battery 10 may or may not be rechargeable. This battery 10 is, for example, a button cell and includes an anode case 12 containing an anode 14. The battery further includes a cathode case 13 fixed to anode case 12. To ensure sealing between anode case 12 and cathode case 13, a seal 16 sealing cathode case 13 to anode case 12 is used.

A cathode 15 is situated inside cathode case 13 between anode 14 and cathode case 13. A membrane 17 is arranged to be situated between anode 14 and cathode 15. Anode case 12 has a first outer surface 21 while cathode case 13 has a second outer surface 22. For example, the first outer surface 21 and the second outer surface 22 are parallel to each other. Battery 10 further includes a third outer surface 23 secant with these first 21 and second 22 surfaces; this third surface 23 forms the edge of battery 10 and consists of a part of anode case 12 and a part of cathode case 13. However, first outer surface 21 and second outer surface 22 may not be parallel and could be curved.

This battery 10 is intended to be placed in an electronic apparatus 100, such as a watch or a calculator. Electronic device 100 includes a case 101 in which an electronic module is arranged. This electronic module is powered by said battery 10. Case 101 is made so as to have, in its back cover 102, a housing 103 in which battery 10 is placed for electrical connection to the electronic module. This housing 103 is closed by a battery hatch cover 104. In general, when battery 10 is arranged in its housing 103, a surface becomes visible to the user. However, it is possible for electronic apparatus 100 to allow several surfaces of battery 10 to be seen. The electrical contact or connection occurs via the opposite surface to the surface seen by the user, generally the second outer surface 22, namely the anode, and via the part of the cathode case of third outer surface 23 acting as the edge of battery 10 through contactors that generally take the form of resilient metal strips.

Advantageously according to the invention, the battery has a marking 18. This marking 18 achieved by local heating of material. In a first embodiment, the local heating of material involves the removal of material from one of the surfaces of the battery. This removal of material is achieved by laser engraving, i.e. a laser beam is directed onto a desired area. The material is then melted and vaporized by the laser. This use of laser engraving has the advantage of providing a simpler battery marking process since only the laser programming changes between one marking 18 and another. Further, this method makes it possible to obtain an engraving depth of between 10 and 200 nm, which is impossible to obtain by stamping. The laser engraving makes it possible to achieve very good adhesion of the marking since it is integrated in the case material.

Preferably, marking 18 is made such that it is electrically non-conductive or insulating. To achieve this, the laser engraving is effected in an oxygen atmosphere so that the oxygen and the engraved material react to cause oxidation of the engraved surface. The oxidation causes a local increase in resistance and thus a lower current flow.

Electrically non-conductive or insulating marking 18 may extend overfirst outer surface 21, second surface 22 or third outer surface 23 provided that it does not disrupt the electrical contact. Naturally, the marking may extend over the first outer 21 and second surface 22 and third outer surface 23 provided the electrical contact with the contactors of electronic apparatus 100 is not broken.

The advantage of having a non-conductive marking 18 is that, for example, it is possible to avoid insulating certain parts of the printed circuit of electronic apparatus 100 powered by battery 10, such as test points that must be accessible when battery 10 is not present, but which must currently be insulated to avoid the risk of a poor contact when battery 10 is inserted. Further, this avoids insulating parts of internal mechanical components of electronic apparatus 100, or of the movement in the case of a timepiece application, which could enter into contact with battery 10.

Another advantage is that it may serve as a mistake proofing. When battery 10 is changed, the user may mistakenly insert the battery the wrong way round. In such case, there is a risk of damage to electrical components that are sensitive to flow direction. Usually, a protective element is provided, such as a diode for preventing such concerns, although the diode does not prevent the flow of current in the opposite direction if battery 10 is mounted the wrong way round, it simply prevents damage. With marking 18 according to the invention, it is possible for the face seen by the user to be marked with a non-conductive marking 18 so that if battery 10 is mounted the wrong way round, the strip spring used to form an electrical contact is in contact with non-conductive marking 18, and the current cannot therefore flow.

The advantage of having a marking 18 with a black colour is that it provides a contrast between the material of battery 10, i.e. of anode case 12 and/or cathode case 13 and said marking 18. This contrast thus means that marking 18 stands out and attracts attention.

Figure 3:
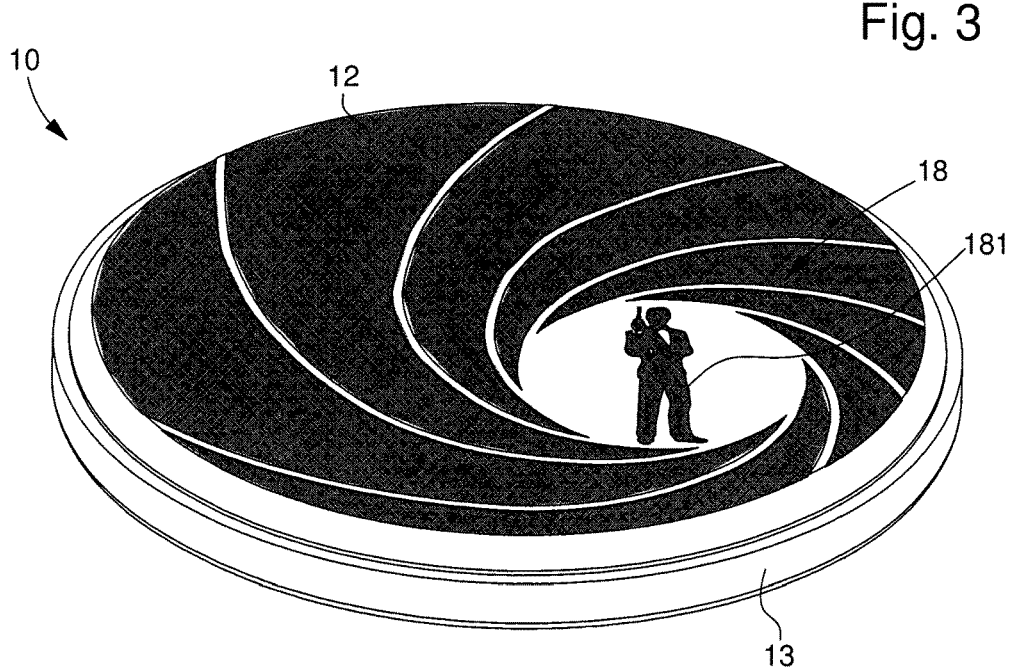
FIG. 3 is a perspective view of a first application of the battery according to the invention.

In a first application, these markings 18 are used to form attractive figures 181 or decorative images as seen in FIG. 3. To this end, the attractive figure(s) 181 are made on the surface(s) of the battery seen by the user when battery 10 is in its hatch 103. These attractive figures 181 may easily be used to make limited editions.

Figure 4:
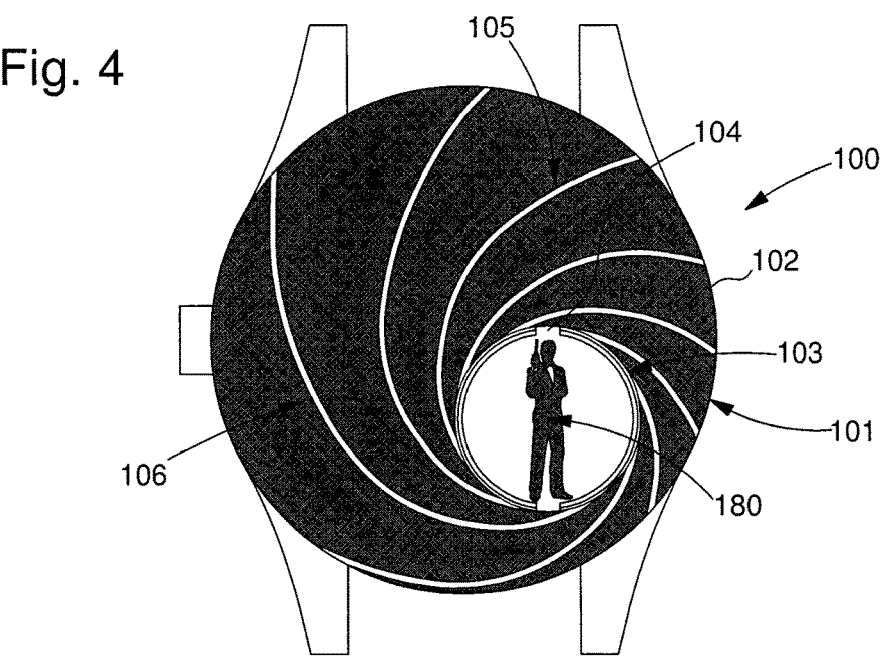
FIG. 4 is a view of the back cover of a watch case with a marking according to the first application of the battery of the invention.

Further, the attractive figure or figures 181 can be incorporated in a larger attractive assembly as seen in FIG. 4. It is possible to envisage having a case 101 for device 100 which includes battery 10 with a decoration 105 and for battery 10 to be a component of decoration 105. To achieve this, marking 18 of battery 10 is devised to cooperate with decoration 105 of case 101 and to form an attractive assembly 106. For example, if case 101 has a decoration consisting of stars forming a specific constellation (not shown), marking 18 of battery 10 may take the form of one or more stars arranged so that said constellation is represented perfectly once battery 10 is in hatch 103. Likewise, it is possible to create a logo, such as that linked to the famous secret agent 007®: with the drawing of the gun barrel forming decoration 105 of case 101 while the human figure forms marking 18.

On the other hand, the attractive figure 181 may simply be the manufacturer's logo or information concerning the features of battery 10 such as the type or voltage/current that it produces. In that case, marking 18 could be colourless so as not to be too visible, especially if it is associated with another marking 18 serving as attractive figure 181. In this application, attractive figure 181 may include a diffraction grating 180 to improve its appearance.

This first application is associated with the advantageous solution of having a hatch 104 for battery 10 made of a transparent material. This transparency allows the user to see markings 18 of battery 10 when he wishes and not only when battery 10 is changed.

In a second application, the marking(s) 18 are utilised for an anti-counterfeiting purpose. This anti-counterfeiting marking 18 may take various forms.

A first form consists in creating a serial number.

Figure 5:
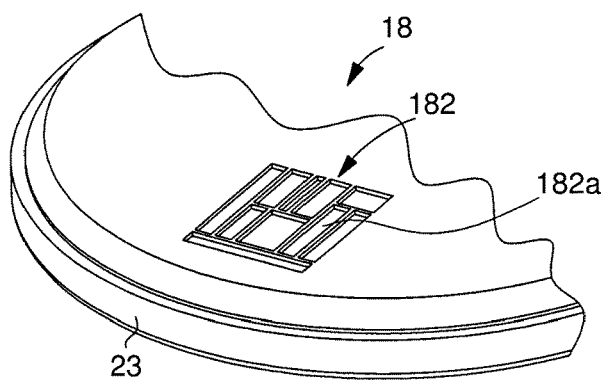
FIG. 5 is a perspective view of a second application of the battery according to the invention.

A second form of anti-counterfeiting marking 18 consists of specific structuring, such as a barcode 182 as seen in FIG. 5. Such a barcode 182 may be two-dimensional, i.e. with laser engraving, it is possible to envisage making a series of recesses 182a which may be shallow or deep, wide or narrow and long or short, and which for example form a square. This specific combination is preferably made in a colourless marking 18 to be as inconspicuous as possible. Barcode 182 can then be scanned to check the authenticity of battery 10.

A conventional barcode 182 formed of a plurality of parallel recesses 182a, of the same depth but with different widths and spacing could be engraved.

It will be clear that various alterations and/or improvements and/or combinations evident to those skilled in the art may be made to the various embodiments of the invention set out above without departing from the scope of the invention defined by the annexed claims.

Naturally, the marking or markings could be arranged to be electrically conductive.

The invention claimed is:

1. An electrical energy accumulator comprising:
   an anode case;
   an anode situated inside the anode case;
   a cathode case fixed to the anode case;
   a seal sealing the cathode case to the anode case;
   a cathode situated inside the cathode case between the anode and the cathode case; and
   a membrane between the anode and the cathode;
   the anode case and the cathode case are fixed to each other respectively and have a first outer surface and a second outer surface, a third outer surface being secant with the first and second surfaces and serving as an edge of the accumulator,
   wherein one of the outer surfaces of the accumulator includes at least one marking created by a local heating of a material of the one of the outer surfaces that engraves the material and reacts the engraved material with oxygen, so that the marking includes an engraved surface of the material that is oxidized to be electrically insulating.

2. The accumulator according to claim 1, wherein the local heating of the material forming the marking removes material.

3. The accumulator according to claim 2, wherein the local heating of the material forming the marking is performed by laser.

4. The accumulator according to claim 1, wherein the local heating of the material forming the marking is performed by laser.

5. The accumulator according to claim 4, wherein the local heating of material by laser is performed so that the marking has a color contrasting with the material of the surface to which the marking is applied.

6. The accumulator according to claim 1, wherein the marking extends over at least any one of the outer surfaces of the accumulator.

7. The accumulator according to claim 1, wherein the marking is an image that is a decoration.

8. The accumulator according to claim 1, wherein the marking is an anti-counterfeiting device.

9. The accumulator according to claim 8, wherein the anti-counterfeiting device includes a combination of plural recesses with different surface dimensions forming an arrangement.

10. The accumulator according to claim 8, wherein the anti-counterfeiting device includes a combination of plural recesses arranged parallel to each other, a space between two recesses and a width of the recesses being heterogeneous to form an arrangement.

11. The accumulator according to claim 1, further comprising at least one electrically conductive marking.

12. An electronic apparatus comprising:
    a closed case including an electronic module, the case including a hatch closed by a hatch cover in which an electrical energy accumulator to electrically power the electronic module can be arranged, wherein the accumulator is an accumulator according to claim 1.

13. The electronic apparatus according to claim 12, wherein the hatch cover is made of a transparent material to allow the marking of the accumulator to be seen.

14. The electronic apparatus according to claim 12, wherein the case of the accumulator includes a decoration and the marking of the accumulator is made such that the decoration and the marking combine to form an assembly.

15. The electronic apparatus according to claim 12, wherein the case includes connectors to obtain an electrical connection between the accumulator and the electronic module and the marking of the accumulator is achieved such that the electrical connection is not disrupted.

16. The accumulator according to claim 1, wherein the marking includes an engraved depth into the one of the outer surfaces of the accumulator that is between 10 and 200 nm.

17. The accumulator according to claim 1, wherein the marking is on an outer surface of the anode case.

18. The accumulator according to claim 1, wherein the marking includes a diffraction grating.

19. The accumulator according to claim 1, wherein the seal is disposed entirely outside of the anode case.

* * * * *